US011466859B2

(12) United States Patent
Swaby et al.

(10) Patent No.: US 11,466,859 B2
(45) Date of Patent: Oct. 11, 2022

(54) GAP FILLER FOR A FUEL SYSTEM GALLERY

(71) Applicant: PRATT & WHITNEY CANADA CORP., Longueuil (CA)

(72) Inventors: Nadia Swaby, York (CA); Sri Sreekanth, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/127,117

(22) Filed: Dec. 18, 2020

(65) Prior Publication Data
US 2022/0196241 A1 Jun. 23, 2022

(51) Int. Cl.
*F23R 3/28* (2006.01)
*F02C 7/22* (2006.01)

(52) U.S. Cl.
CPC ............... *F23R 3/283* (2013.01); *F02C 7/22* (2013.01)

(58) Field of Classification Search
CPC .... F23R 3/22; F23R 3/28; F23R 3/283; F23R 3/286; F23R 3/30; F23R 2900/00012
See application file for complete search history.

(56) References Cited

U.S. PATENT DOCUMENTS

| | | | | |
|---|---|---|---|---|
| 2,592,111 A | * | 4/1952 | Bischof | F02M 61/08 239/533.7 |
| 3,662,959 A | * | 5/1972 | Sample, Jr. | F23D 11/26 239/533.2 |
| 4,491,272 A | * | 1/1985 | Bradley | F23D 11/26 239/104 |
| 5,253,810 A | * | 10/1993 | Maltby | B05B 9/002 239/397.5 |
| 6,112,971 A | | 9/2000 | Castaldo et al. | |
| 6,901,953 B2 | * | 6/2005 | D'Agostino | F23K 5/147 137/512.1 |
| 8,636,263 B2 | * | 1/2014 | Deaton | F02C 9/263 251/337 |
| 2009/0255262 A1 | * | 10/2009 | McMasters | F23R 3/28 60/742 |
| 2010/0050647 A1 | * | 3/2010 | Goodwin | F23R 3/28 60/748 |

(Continued)

FOREIGN PATENT DOCUMENTS

DE 102018003952 11/2019
JP 2014098694 5/2014

*Primary Examiner* — William H Rodriguez
(74) *Attorney, Agent, or Firm* — Norton Rose Fulbright Canada LLP

(57) ABSTRACT

A nozzle assembly for a gas turbine engine, comprising: a nozzle at a downstream end of the assembly relative to fuel flow; a first and a second body upstream of the nozzle, the first body defining a first passage between a first inlet connectable to a source and a first outlet, and the second body defining a second passage between a second inlet and a second outlet in fluid communication with the nozzle, the inlets in fluid communication with each other; the bodies matingly engaged together along an axis, the inlets spaced apart relative to the axis to define a gallery having a depth in an axial direction and a width in a transverse direction; and a gap filler within the gallery, compressible in at least one of the directions, having an uncompressed dimension greater than a corresponding dimension of the gallery in the at least one of the directions.

18 Claims, 5 Drawing Sheets

(56) References Cited

U.S. PATENT DOCUMENTS

| | | | |
|---|---|---|---|
| 2012/0151930 A1* | 6/2012 | Patel | F23R 3/283 |
| | | | 60/746 |
| 2012/0180488 A1 | 7/2012 | Bailey et al. | |
| 2014/0090394 A1* | 4/2014 | Low | F23D 11/107 |
| | | | 60/776 |
| 2014/0245740 A1* | 9/2014 | Wiebe | F02C 7/22 |
| | | | 60/740 |
| 2014/0338337 A1* | 11/2014 | Prociw | F23R 3/28 |
| | | | 60/737 |
| 2016/0116168 A1 | 4/2016 | Bandaru et al. | |
| 2017/0122212 A1* | 5/2017 | Cadman | F23R 3/28 |
| 2017/0176010 A1* | 6/2017 | Ryon | F02C 7/222 |
| 2017/0298829 A1* | 10/2017 | Ozem | F23D 11/383 |
| 2018/0010801 A1* | 1/2018 | Strzepek | F23R 3/60 |
| 2018/0017194 A1 | 1/2018 | Grouillet et al. | |
| 2019/0257251 A1* | 8/2019 | Godel | F02C 7/264 |
| 2019/0292988 A1* | 9/2019 | Chabaille | F23K 5/147 |
| 2019/0368420 A1* | 12/2019 | Myatlev | F02C 7/22 |
| 2021/0164577 A1* | 6/2021 | McCormack | F23K 5/147 |

* cited by examiner

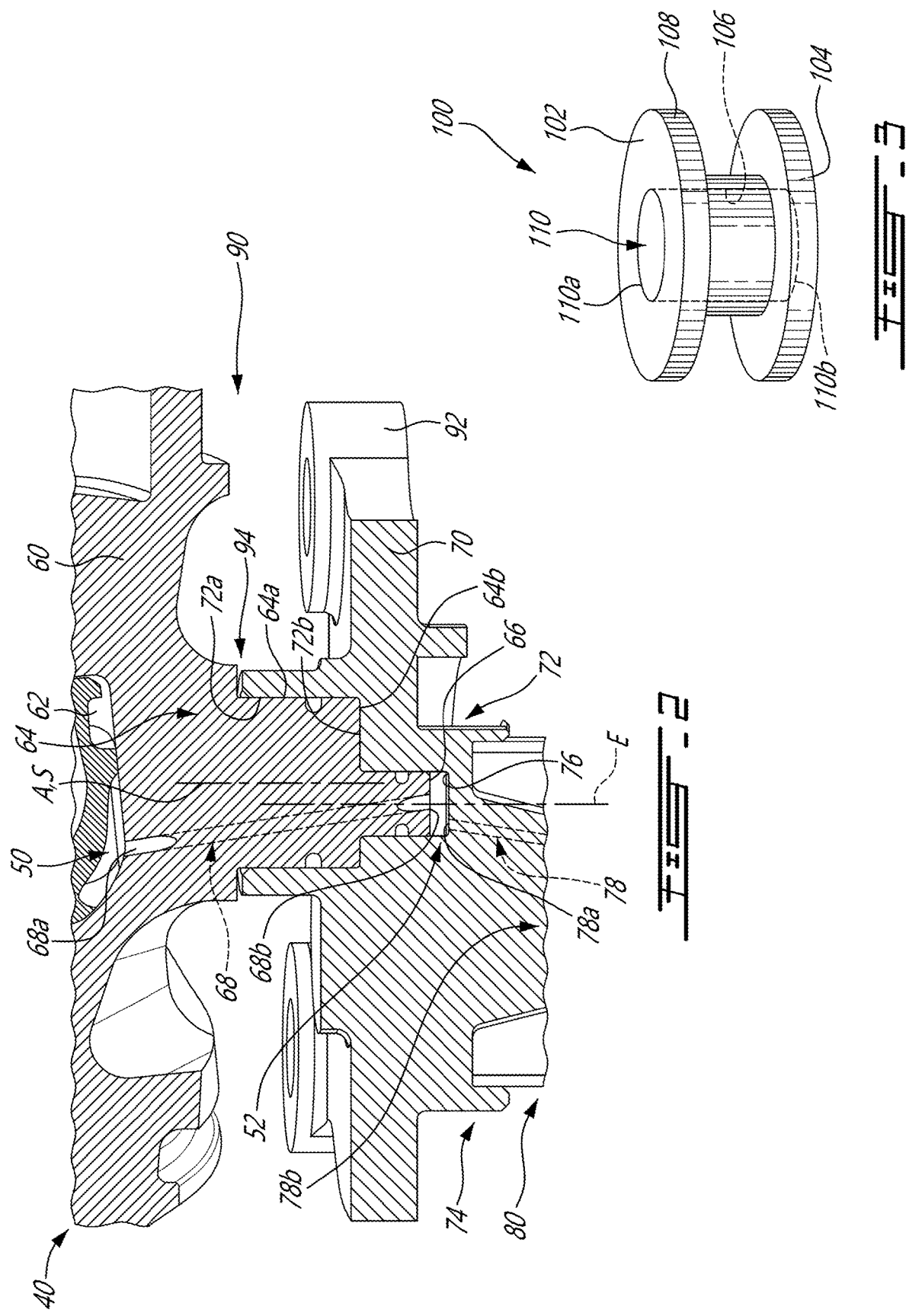

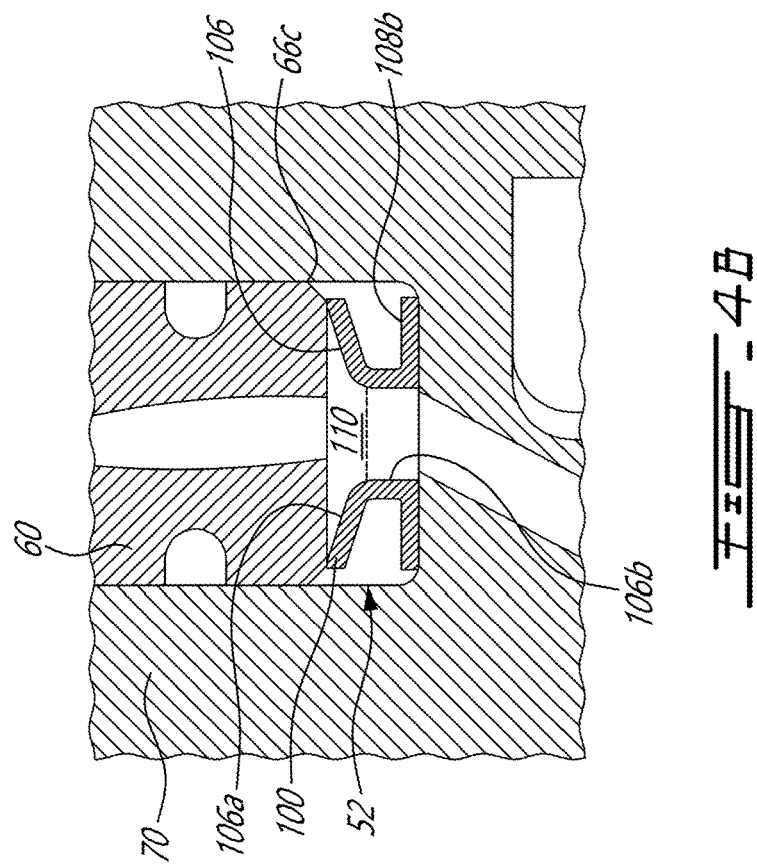
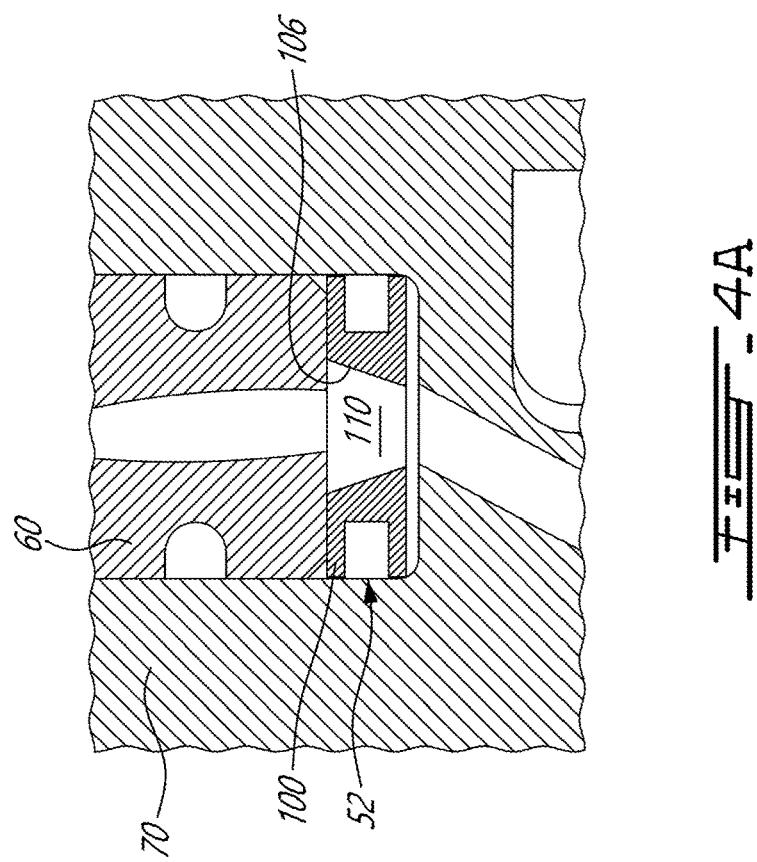

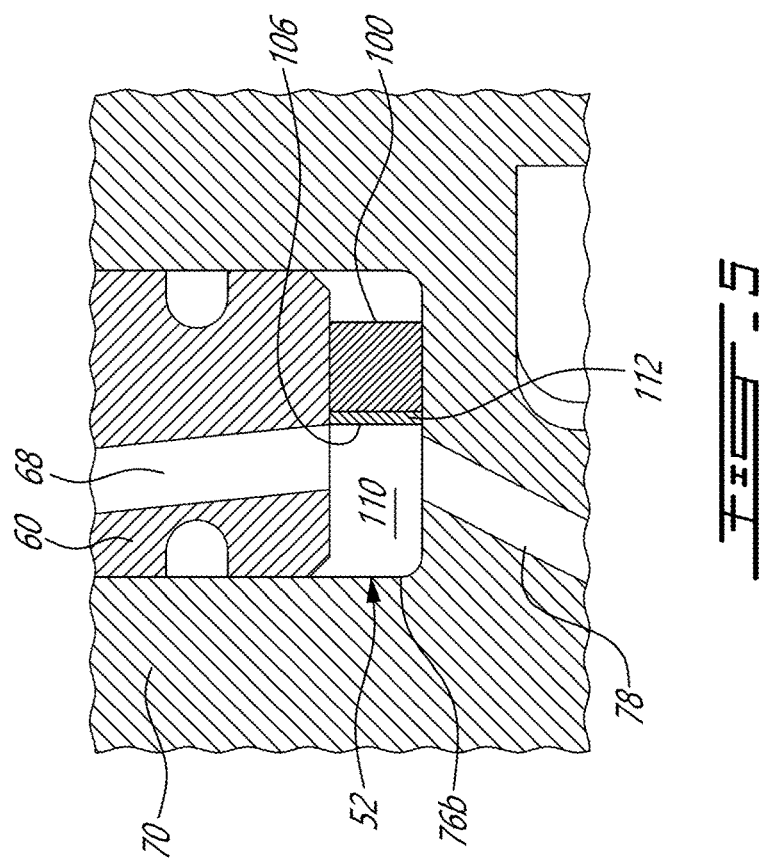
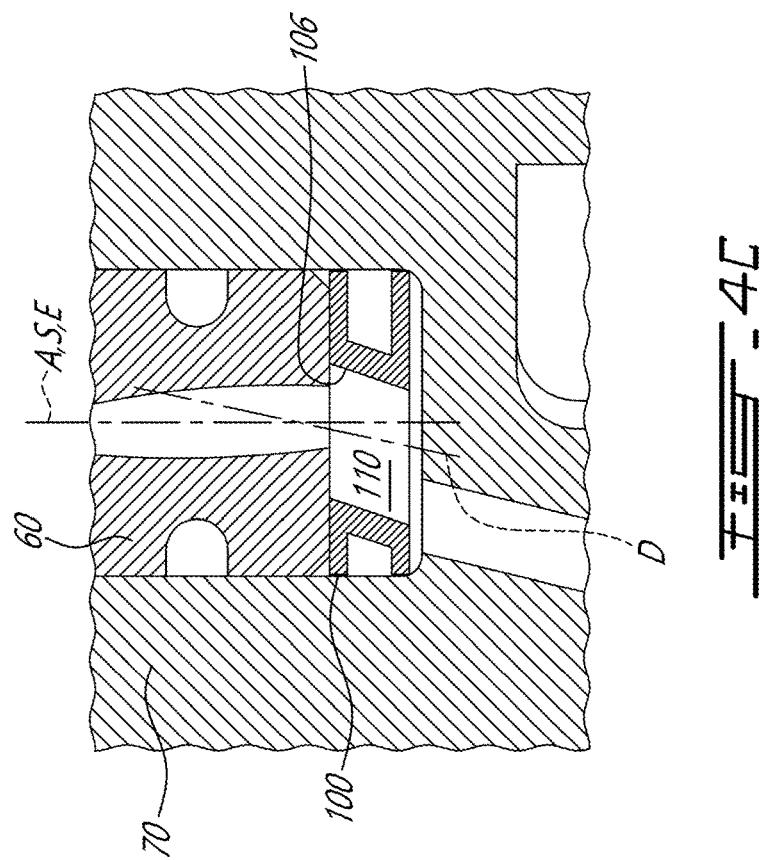

GAP FILLER FOR A FUEL SYSTEM GALLERY

TECHNICAL FIELD

The present disclosure relates generally to fuel systems of gas turbine engines and, more particularly, to fuel nozzle assemblies for such fuel systems.

BACKGROUND

Fuel nozzles of gas turbine engines operate by atomizing liquid fuel into a flow of droplets suitable for combustion and efficient extraction of energy. One or more conduits are provided for carrying the fuel from a fuel source of the engine toward atomizing features of the fuel nozzle. Typically, such conduits must be routed along non-linear paths and are segmented across multiple components between the fuel source and the fuel nozzle. Such discontinuities, particularly where gaps or unwanted fuel galleries may be formed, may lead to coking, a phenomenon by which a deposit of fuel constituents such as carbon may gradually build-up onto conduit walls when high-temperature yet unburned fuel runs therealong. Monitoring and servicing techniques dedicated to coking management are conventionally employed to maintain optimal fuel nozzle performance and minimize engine downtime.

SUMMARY

In an aspect of the present technology, there is provided a fuel nozzle assembly for a fuel system of a gas turbine engine, the fuel nozzle assembly comprising: a fuel nozzle at a downstream end of the fuel nozzle assembly relative to fuel flow through the fuel nozzle assembly; a first body and a second body upstream of the fuel nozzle, the first body defining a first fuel passage extending between a first inlet fluidly connectable to a fuel source of the fuel system and a first outlet, and the second body defining a second fuel passage extending between a second inlet and a second outlet in fluid communication with the nozzle, the first outlet and the second inlet being in fluid communication with each other; a downstream end of the first body having the first outlet and an upstream end of the second body having the second inlet matingly engaged together along an engagement axis, the first outlet and the second inlet being spaced apart in an axial direction relative to the engagement axis to define a gallery between the first body and the second body, the gallery having a depth in the axial direction and a width in a transverse direction relative to the engagement axis; and a gap filler disposed within the gallery, the gap filler being compressible in at least one of the axial direction and the transverse direction, the gap filler having an uncompressed dimension in said at least one of the axial direction and the transverse direction, the uncompressed dimension being greater than a corresponding dimension of the gallery in said at least one of the axial direction and the transverse direction.

In another aspect, there is provided a gas turbine engine, comprising: a compressor, a turbine and a combustor disposed between the compressor and the turbine, the combustor including a casing and a fuel nozzle assembly received inside the casing, the fuel nozzle assembly including: a fuel nozzle at a downstream end of the fuel nozzle assembly relative to fuel flow through the fuel nozzle assembly; a fuel nozzle adapter and a fuel nozzle stem upstream of the fuel nozzle, the adapter defining a first fuel passage extending between a first inlet in fluid communication with a fuel source of the gas turbine engine and a first outlet, and the stem defining a second fuel passage extending between a second inlet and a second outlet in fluid communication with the fuel nozzle, the first outlet and the second inlet being in fluid communication with each other; a downstream end of the adapter having the first outlet and an upstream end of the stem having the second inlet matingly engaged together along an engagement axis, the first outlet and the second inlet being spaced apart in an axial direction relative to the engagement axis to define a gallery between the adapter and the stem, the gallery having a depth in the axial direction; and a gap filler disposed within the gallery, the gap filler being compressible in the axial direction, the gap filler having an uncompressed axial length being greater than a corresponding dimension of the gallery in the axial direction.

In yet another aspect, there is also provided a method of making a fuel nozzle assembly including: aligning a downstream portion of a fuel nozzle adapter with an upstream portion of a nozzle stem relative to an engagement axis, matingly engaging the downstream portion and the upstream portion along the engagement axis such that the downstream portion and the upstream portion together define a gallery, positioning the downstream portion relative to the upstream portion relative to one another along the engagement axis so as to define an axial depth of the gallery and to position an outlet of the upstream portion and an inlet of the downstream portion at either end of a gap filler located inside the gallery and extending axially relative to the axial depth.

In some embodiments, the method further comprises compressing the gap filler between the upstream and downstream portions so as to conform the gap filler to the axial depth of the gallery.

In some embodiments, the method further comprises positioning the gap filler relative to at least one of the upstream and downstream portions so as to direct a passage of the gap filler away from the outlet of the upstream portion toward the inlet of the downstream portion.

In some embodiments, the method comprises affixing the gap filler to one of the upstream and downstream portions prior to mating engagement.

BRIEF DESCRIPTION OF THE DRAWINGS

Reference is now made to the accompanying figures in which:

FIG. 2 is a cross-sectional, close-up view of a fuel nozzle assembly of the gas turbine engine of FIG. 1, showing portions of an adapter and of a stem of the fuel nozzle assembly together forming a gallery of the fuel nozzle assembly and respectively forming a first passage upstream of the gallery and a second passage downstream of the gallery;

FIG. 3 is a perspective view of a compressible gap filler of the fuel nozzle assembly of FIG. 2 according to an embodiment, the gap filler shown isolated from a remainder of the fuel nozzle assembly;

FIG. 4A is a cross-sectional view of the gallery of FIG. 2 shown fitted with a gap filler according to another embodiment, the gap filler having an inner surface with a frusto-conical profile;

FIG. 4B is a cross-section of the gallery of FIG. 2 shown fitted with a gap filler according to yet another embodiment, the gap filler having an inner surface with a funnel-like profile;

FIG. 4C is a cross-section of a gallery of another fuel nozzle assembly fitted with a gap filler according to another embodiment, the gap filler having a cylindrical inner surface extending at an angle; and FIG. 5 is a cross-sectional view of a gallery shown fitted with a gap filler according to yet another embodiment, the gap filler having an open inner surface facing a periphery of the gallery and exposed to the first passage and to the second passage.

DETAILED DESCRIPTION

Figure 1:
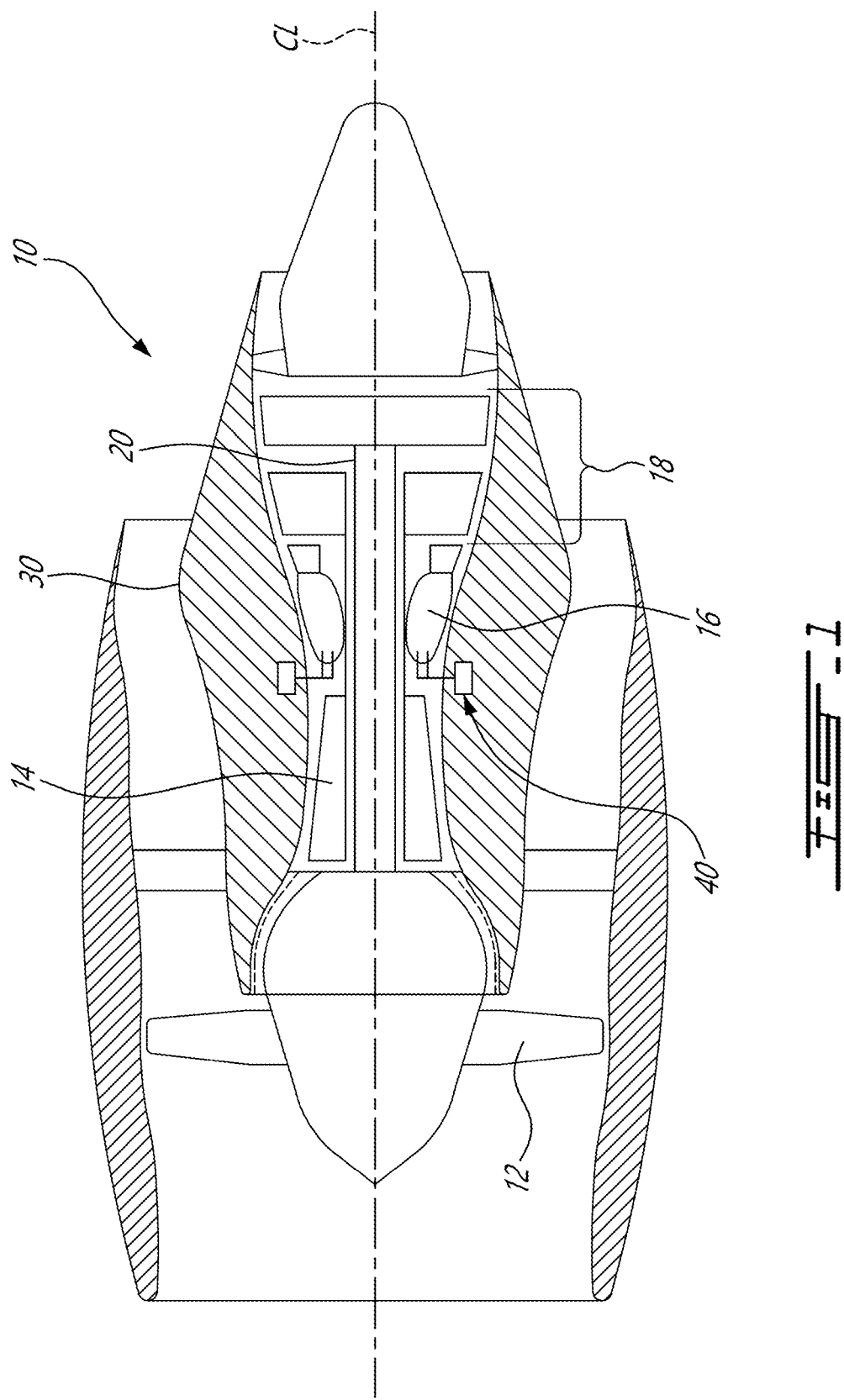
FIG. 1 is a cross-sectional schematic view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14, the combustor 16 and the turbine section 18 are disposed along a main shaft 20 and surrounded by a casing 30 of the engine 10. The main shaft 20 and the casing 30 are generally coaxial as they both extend along a centerline axis CL of the engine 10. A fuel system of the engine 10 includes a fuel source (not shown) and at least one fuel nozzle assembly 40 mounted to the casing 30 and fluidly connected between the fuel source and a combustion chamber of the combustor 16. Via the fuel nozzle assembly 40, the fuel source provides the combustor 16 with a flow of fuel which is to be combusted with the air inside the combustion chamber in order to generate the hot combustion gases.

An example of one such fuel nozzle assembly 40 is partially shown in FIG. 2. In this embodiment, the fuel nozzle assembly 40 is a modular structure that includes a series of components each having path-defining surfaces, i.e., surfaces extending alongside a portion of a fuel flow path 50. Such components may be traversed by one or more fuel passages or conduits corresponding to portions of the fuel flow path 50. Beginning at an upstream end of the fuel nozzle assembly 40 where fuel is received from the fuel source, fuel flows along the fuel flow path 50 within the fuel nozzle assembly 40 to a downstream end thereof, which may include a fuel ejector nozzle, located inside the combustion chamber where the fuel is combusted.

The fuel nozzle assembly 40 defining the fuel flow path 50 includes a first body 60 at the upstream end near the fuel source, a second body 70 assembled to the first body 60 and a fuel nozzle 80 at the downstream end and assembled to the second body 70. The first body 60 and the second body 70 may be respectively referred to as a fuel adapter 60 and a fuel stem 70, and collectively referred to as a fuel nozzle mount 90 via which the fuel nozzle 80 is operatively mounted relative to the fuel source and to the combustion chamber. The nozzle mount 90 is fluidly connected to the fuel source via the fuel adapter 60 and mechanically fastened to the casing 30, in this case via outer mounting flange(s) 92 of the fuel stem 70. A sheath of the fuel nozzle 80 surrounds a downstream portion of the fuel stem 70 and extends away therefrom to the downstream end of the fuel nozzle assembly 40 where the sheath houses features of the fuel nozzle 80 arranged for atomizing the fuel into fine, airborne particles. As each of the above components of the fuel nozzle assembly 40 are located either inside or in proximity to the combustion chamber of the combustor 16, such components are generally constructed of one or more heat resistant metals, alloys or composites.

As will be described in further detail below, the fuel nozzle assembly 40 also includes a gap filler 100 (FIG. 3) disposed into one of the flow-path-defining passages to locally affect the flow dynamics otherwise imparted in absence of the gap filler 100.

In this embodiment, the fuel nozzle assembly 40 is arranged for supplying pressurized air into the combustion chamber in addition to the fuel, via a dedicated air flow path (not shown). The air is taken from a pressure source upstream of the fuel nozzle assembly 40, and mixed with the flow of fuel at the fuel nozzle 80 to atomize the fuel within the combustor. However, it shall be appreciated that the fuel nozzle assembly 40 may arranged otherwise. For example, depending on the implementation, the fuel nozzle assembly 40 can be structured, mutatis mutandis, for routing a sole flow of fluid, or more than two distinct flows of fluid.

It should be understood that the terms "upstream" and "downstream" respectively refer to the origin and to the destination of the fuel, i.e., to the general direction along which fuel travels from one component of the engine 10 to the next, and not to spatial arrangement of either such component relative to fore and aft ends of the engine 10. For example, the above does not preclude that in some implementations, the fuel adapter 70 may connect to the fuel source at a location aft of the fuel nozzle 80. Nevertheless, in the present embodiment, the fuel nozzle 80 is located fully aft of the fuel adapter 70, and extends further aft yet at an angle relative to the centerline axis CL of the engine 10. For brevity, the term "fuel" will be omitted from the names of elements 40, 50, 60, 70, 80 and 90 from here on out. Also, it should be noted that the present disclosure will henceforth focus on characteristics of the nozzle assembly 40 upstream of the nozzle 80 and pertaining to a single fuel flow of the fuel supply (i.e., the flow path 50). Characteristics of the nozzle assembly 40 pertaining to the nozzle 80 and to nozzle-specific features of the stem 80 are disclosed in U.S. Pat. No. 10,184,403, of which all content is incorporated herein by reference.

As the engine 10 operates, some of the heat produced by the combustor 16 transfers from inside the combustion chamber to the nozzle assembly 40, an effect that can linger during shutdown and even thereafter as the engine 10 cools. Despite the path-defining surfaces of the nozzle assembly 40 not following any particular heat gradient as they extend from the upstream end to the downstream end of the nozzle assembly 40, a notional periphery of such surfaces, and thus of the flow path 50, may be said to be generally more prone to heating the closer it is to the combustion chamber. Conversely, a notional amount of the fuel transiting along such surfaces may be said to become more exposed to heat the more downstream it gets.

It should be noted that the surfaces of the nozzle assembly 40 defining the flow path 50 are positioned, oriented and/or sized such that the fuel running along these surfaces maintains a temperature under a maximum temperature threshold (e.g., 400 C) and an average flow velocity above a minimum velocity threshold (e.g., 4 m/s) and arrives at the downstream end with a flow velocity and temperature suitable for atomization. Such conditions may desirably mitigate the risk of coking. However, local variations in fuel flow dynamics, among other factors, may allow coking to develop over the course of several engine operation cycles. For example, sections of the flow path 50 corresponding to interfaces between consecutive flow-path defining components of the nozzle assembly 40 and characterized by markedly increased, or bulged, cross-sectional area may be referred to as galleries of the nozzle assembly 40, for example the one identified at 52. In such galleries 52, flow velocity may decrease and, in some cases, fuel may even pool and stagnate, rendering the galleries 52 prone to coking. Additional factors that may contribute to coking include locally-high temperatures in certain regions of the nozzle assembly 40, low fuel source pressure and even composition of the fuel being used. On the other hand, as will become apparent from the forthcoming, certain flow-path defining features of the nozzle assembly 40 may assist in mitigating the risk of coking, for instance inside the gallery 52.

Still referring to FIG. 2, structural characteristics of the adapter 60 and of the stem 70 will now be described. The adapter 60 has an upstream portion 62 that forms a segment of a fuel line of the fuel system. Generally tubular in shape, the upstream portion 62 has a hollow interior with opposite openings in fluid communication with the fuel source, respectively via supply and return lines of the fuel system. The adapter 60 may be described as a segment of the fuel line that is structured to be fluidly connected to the stem 80. Stated otherwise, the adapter 60 is a portion of the nozzle assembly 40 structured for tapping into the fuel line. For this purpose, a downstream portion 64 of the adapter 60 extends away from the upstream portion 62 along an adapter engagement axis A, defining an adapter engagement surface 66 surrounding the axis A. The adaptor 60 also defines an adapter fuel passage 68 (i.e., a first fuel passage 68 of the first body 60) extending inwardly of the upstream portion 62 from the hollow interior and throughout the downstream portion 64 of the adapter 60. A first outlet 68a of the first passage 68 is in fluid communication with the fuel source via the hollow interior. Across the first passage 68 opposite the first inlet 68a, a first outlet 68b thereof is surrounded by the adapter engagement surface 66 at a location spaced away from the first inlet 68a relative to the axis A. The first outlet 68b is defined in a portion of the adapter engagement surface 66 that may be referred to as a downstream end of the adapter 60.

The stem 70 has an upstream portion 72 provided for fluidly connecting the stem 70 to the adapter 60 and a downstream portion 74 via which it is fluidly connected to the nozzle 80. The upstream portion 72 extends away from the downstream portion 74 along a stem engagement axis S, defining a stem engagement surface 76 surrounding the axis S. The stem 70 also defines a stem fuel passage 78 (i.e., a second fuel passage 78 of the second body 70) extending inwardly of the upstream portion 72 of the stem 70 and throughout the downstream portion 74. A second inlet 78a of the second passage 78 is surrounded by the stem engagement surface 76. The second inlet 78a is defined in a portion of the stem engagement surface 76 that may be referred to as an upstream end of the stem 70. Across the second passage 78 opposite the second inlet 78a, a second outlet 78b of the second passage 78 is in fluid communication with the nozzle 80, at a location that is spaced away from the second inlet 78a relative to the axis S.

For the nozzle assembly 40 to be maintained in a suitable position relative to the casing 30 and to the fuel system of the engine, the nozzle mount 90 is also provided with one or more mounting flanges (or a "support") 92 structured to be mechanically attached to the casing 30. In this exemplary implementation, the support 92 is provided in the form of a flange forming a unitary piece with the stem 70 and adapted to be attached to the casing 30 via fasteners. Among possible alternate implementations, the support 92 can instead be joined to the adapter 60. The support 92 can also form a piece distinct from either of the adapter 60 and the stem 70 and itself mechanically attached to the nozzle mount 90. Other structural variations and mechanical attachment means are contemplated.

The downstream portion 64 of the adapter 60 and the upstream portion 72 of the stem 70 are matingly engaged to one another along an engagement axis E in such a way that may facilitate mechanical attachment of the nozzle mount 90. Upon engagement, the downstream end of the adapter 60 and the upstream end of the stem 70 face one another and are spaced relative to each other such that the adapter and stem engagement surfaces 66, 76 overlap one another relative to the engagement axis E. It shall thus be appreciated that the gallery 52 referred to hereinabove corresponds to a volume enclosed by the nozzle mount 90, located between the downstream end of the adapter 60 and the upstream end of the stem 70 and surrounded by non-overlapping portions of the adapter and stem engagement surfaces 66, 76. Further, this engagement can be described as a sliding engagement. Indeed, upon engagement, the stem 70 may nevertheless be slidable relative to the adapter 60 within a predetermined sliding distance range defined relative to the axis E. This sliding is governed by the cooperation of mating features of the downstream portion 64 of the adapter 60 with complementary mating features of the upstream portion 72 of the stem 70. Namely, in this embodiment, the downstream portion 64 of the adapter 60 is a shaft-like projection and the upstream portion 72 of the stem 70 is a socket-like recess, respectively having complementary running surfaces 64a, 72a and complementary shoulder surfaces 64b, 72b. In the depicted exemplary implementation, the running surface 64a and the shoulder surface 64b of the adapter 60 extend respectively longitudinally and transversely relative to the axis A, whereas the running surface 72a and the shoulder surface 72b of the stem 70 extend respectively longitudinally and transversely relative to the axis S. The running surfaces 64a, 74a are arranged to be cooperable for mutual alignment relative to the engagement axis E, and to overlap one another relative to the axis E from a first relative position at which the engagement begins to a second relative position at which the complementary shoulder surfaces 64b, 72b abut against one another, as shown in FIG. 2. The abuttable shoulder surfaces 64b, 72b are merely one of several suitable means for spacing the first outlet 68b and the second inlet 78a from one another axially relative to the engagement axis E by a distance corresponding to an axial depth of the gallery 52. In embodiments, the axial depth is variable between a maximum depth and a minimum depth respectively corresponding to the first and second relative positions of the running surfaces 64a, 74a. Thus, the minimum depth of the gallery 52 defined relative to the axis E between the first outlet 68b and the second inlet 78a corresponds to the second relative position, at which the distance between the first outlet 68b and the second inlet 78a is minimized. In some such embodiments, the distance may be increased between the first outlet 68b and the second inlet 78a while maintaining the engagement, for example upon the running surfaces 64a, 74a moving away from the second relative position toward the first relative position corresponding to the maximum depth.

It should be noted that the adapter and stem engagement surfaces 66, 76 are not aligned with the running surfaces 64a, 72a relative to the engagement axis E, although they could be in other embodiments. Hence, the axes A and S are parallel to the axis E, but it is not necessary that they be collinear therewith. Although generally cylindrical in shape, any one of the surfaces 64a, 72a, 66, 76 could be shaped otherwise so long as suitable structural integrity and engagement functionality of the nozzle assembly 40 are enabled. It is also contemplated that in alternate embodiments, the downstream portion 64 of the adapter 60 is a socket-like recess and the upstream portion 72 of the stem 70 is a shaft-like projection, with a remainder of the nozzle assembly 40 adapted so as to be consistent with the previously-described alternative.

With reference to FIG. 3, the gap filler 100 will now be described in more detail. Although the gap filler 100 is not shown in FIG. 2 for clarity, the gap filler 100 is to be located inside the fuel gallery 52 and thus exposed to the flow path 50 between the first passage 68 and the second passage 78. The gap filler 100 generally extends between opposite sides, also referred to as upstream 102 and downstream 104 ends of the gap filler 100, and is fitted to the gallery 52 so as to extend axially between its ends 102, 104, relative to the engagement axis, and hence, in a direction consistent with the axial depth of the gallery 52. Also, the gap filler 100 is structured so as to be conformable to a size of the gallery 52, at least with respect to its axial depth. The gap filler 100 is structured so as to be axially compressible (i.e. axially in the direction of the engagement axis E) at least down to the axial depth of the gallery 52 under a compressive load exerted thereto at its ends 102, 104, for example via the downstream end of the adapter 60 and the upstream end of the stem 70 being in the second relative position. As such, in some embodiments, the gap filler 100 is sized so as to be axially taller than the axial depth of the gallery 52 in absence of external axial loading. Stated otherwise, in such embodiments, the gap filler 100 has an uncompressed axial length that is greater than the axial depth of the gallery 52. In other embodiments, the uncompressed axial length of the gap filler 100 may instead correspond to the axial depth of the gallery 52 or even be smaller, and nevertheless become compressed in use, as will be explained hereinbelow. Not unlike a remainder of the nozzle assembly 40, the gap filler 100 is constructed of heat-resistant materials, which may however be less rigid than those used for the adapter 60 and the stem 80. Also, in addition to metals, metallic alloys and composites, suitable materials for the gap filler 100 include elastomeric materials. The gap filler 100 inherits its axially-compressible nature from properties inherent to its materials and/or its structure.

A shape of the gap filler 100 can be generally described as being suitable for filling a portion of the gallery 52 extending along the axial depth and, as a result, reducing the flow path 50 to a remainder of the gallery 52, or at least to a portion thereof. To this effect, an inner surface 106 of the gap filler 100 extends between the ends 102, 104, exposed to the first outlet 68b and to the second inlet 78a. An outer surface 108 of the gap filler 100 facing generally away from the inner surface 106 may conform to a shape of the stem engagement surface 76, albeit not necessarily so. In embodiments such as the one depicted in FIG. 3, the gap filler 100 is generally annular in shape, and the inner surface 106 forms an enclosed passage 110 (henceforth referred to as a third passage 110) having a third inlet 110a located at the upstream end 102 and a third outlet 110b located at the downstream end 104 opposite the third inlet 110a.

Figure 4:
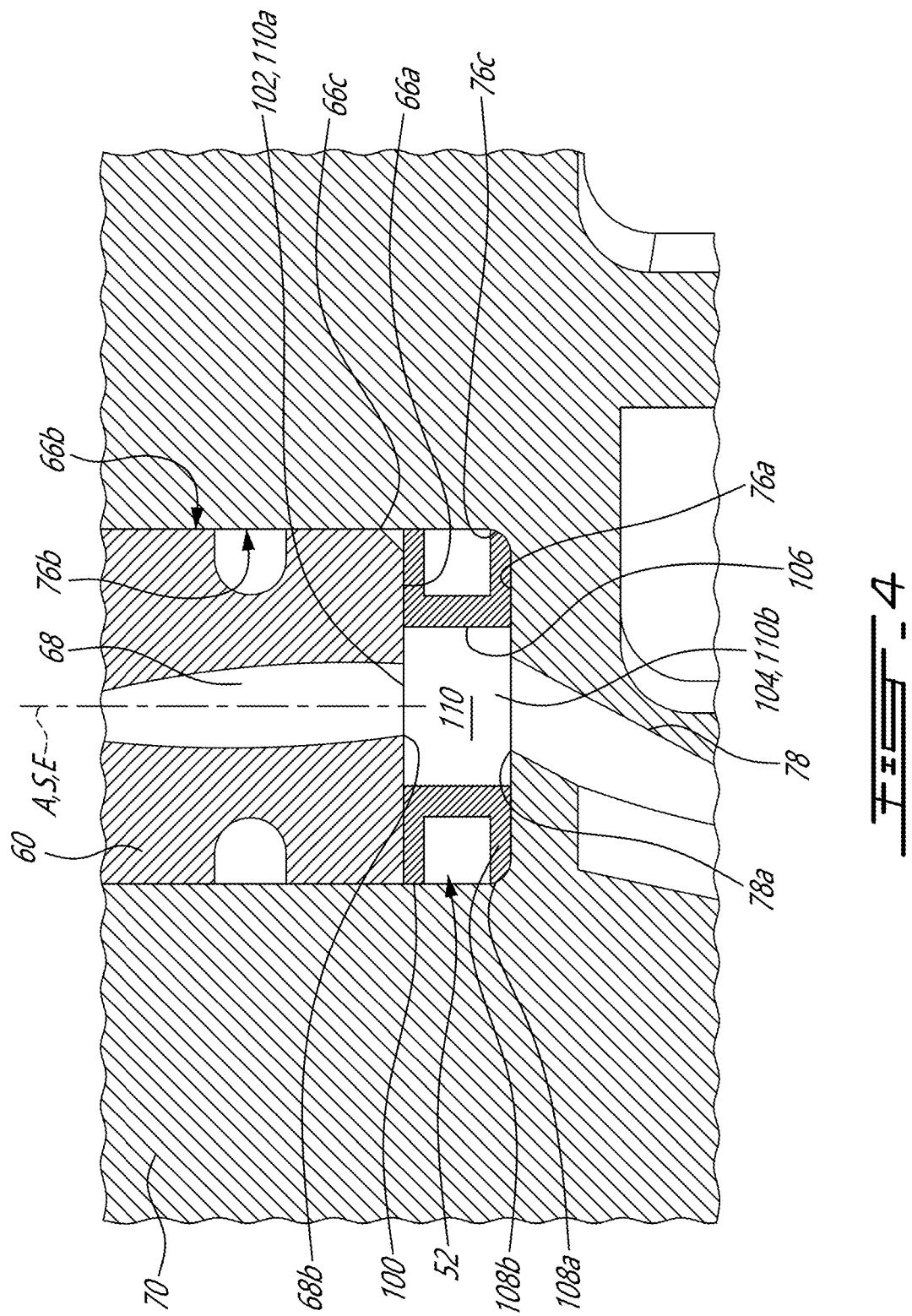
FIG. 4 is a cross-sectional view of the gallery of FIG. 2 and of the gap filler of FIG. 3 fitted in the gallery, the gap filler having an inner surface with a cylindrical profile surrounding a third passage of the fuel nozzle assembly extending between the first passage and the second passage.

Turning now to FIG. 4, characteristics of gallery-defining features of the nozzle mount 90 will be described. The adapter engagement surface 66 of the adapter 60 includes an adapter end surface 66a in which the first outlet 68b is defined, and a peripheral wall 66b with a peripheral edge 66c contiguous to the end surface 66a. The end surface 66a extends generally transversely relative to the axis A, facing away from the first inlet 68a. In this embodiment, the end surface 66a is chamfered adjacent the peripheral edge 66c, a feature that may aid in initiating the engagement with the stem engagement surface 76, and otherwise remains generally flat as it extends toward the first outlet 68b. The peripheral wall 66b extends axially away from the end surface 66a relative to the axis A and surrounding the axis A, facing generally radially outward relative thereto.

The stem engagement surface 76 of the stem 70 includes a stem end surface 76a in which the second outlet 78a is defined, and a peripheral wall 76b with a peripheral edge 76c contiguous to the end surface 76a. The peripheral wall 76b of the stem engagement surface 76 defines a transverse breadth of the gallery 52 relative to the engagement axis E, i.e., a size of the gallery 52 measurable transversely to the axial depth. The end surface 76a extends generally transversely relative to the axis S, facing away from the second outlet 78a. In this embodiment, the end surface 76a forms a radius adjacent to the peripheral edge 76c, a manufacturing artifact whose shape corresponding to a negative of a shape of a tool used to machine the stem engagement surface 76. The end surface 76a otherwise remains generally flat as it extends toward the second inlet 78a. The peripheral wall 76b extends axially away from the end surface 76a relative to the axis S and surrounding the axis S, facing generally radially inward relative thereto. The above is specific to merely one of the various complementary shapes contemplated for the adapter and stem engagement surfaces 66, 76.

In the present embodiment, the peripheral wall 76b of the stem engagement surface 76 and the peripheral wall 66b of the adapter engagement surface 76 are both cylindrical in shape and respectively extend coaxially to the axis S and to the axis A. Upon engagement of the adapter and stem engagement surfaces 66, 76, the axes A, S are collinear. The adapter engagement surface 66 has an annular groove defined radially inwardly of the peripheral wall 66b relative to the axis A, in which may be received a toroidal seal sized and structured to slidably engage the peripheral wall 76b. The adapter engagement surface 66 having a seal-receiving groove is merely one of sealing features contemplated for sealing the gallery 52 (i.e., sealing passage to and fro the gallery 52 other than via the first outlet 68b or the second inlet 78a) via either one or both of the adapter and stem engagement surfaces 66, 76. The presence of the gap filler 100 inside the gallery 52 may in certain embodiments also assist in sealing the gallery 52. However it is to be understood that while some nominal sealing function may be provided by the gap filler 100 in that it fills a portion of the interior volume of the gallery 52 and may closely espouse a shape of either one or both of the adapter and stem engagement surfaces 66, 76, the gap filler 100 does not necessarily seal any gap.

The first outlet 68b and the second inlet 78a are respectively intercepted by the axes A, S, although neither of the first passage 68 and the second passage 78 extends axially relative to, let alone coaxially with, either of the axes A, S and E. It shall be appreciated that this is merely one of multiple spatial arrangements possible for the passages 68, 78, as position and orientation of the passages 68, 78 forming the flow path 50 may vary depending on the implementation of the fuel nozzle assembly 40 which, in turn, may dictate how flow-path interfacing features of the gap filler 100 are arranged.

Still referring to FIG. 4, the gap filler 100 is shown fitted inside the gallery 52 and generally conformed to its axial depth, with the third passage 110 generally cylindrical, extending axially relative to the engagement axis E, and sized and arranged to be in fluid communication between the first and second passages 68, 78. The upstream end 102 of the gap filler 100 may be in contact with the end surface 66*a* of the adapter engagement surface 66 and may even have a shape conforming to that of the end surface 66*a*. As is the case in the depicted embodiment, the downstream end 104 of the gap filler 100 is in contact with the end surface 76*a* of the stem engagement surface 76. Moreover, the downstream end 104 conforms to a shape of the end surface 76*a*. In this instance, the gap filler 100 is shown in a compressed state, in which the downstream end 104 is deformed so as to conform to the shape of the end surface 76*a*. Moreover, in the compressed state, the outer surface 108 of the gap filler 100 is deformed so as to conform to a shape of the peripheral wall 76*b*. The gap filler 100 may thus be said to be sized relative to the peripheral wall 76*b* to establish an interference fit therewith upon being disposed in the gallery 52. In other embodiments, an uncompressed shape of the downstream end 104 may correspond to the shape of the end surface 76*a*, and an uncompressed shape of the outer surface 108 may correspond to the shape of the peripheral wall 76*b*. Also, an axial gap may also be present at either end 102, 104 of the gap filler, for example between the outlet 110*b* of the third passage 110 and the second inlet 78*b*. The outer surface 108 may be provided with a contour, such as a peripheral edge 108*a* at its downstream end 104, that is shaped complementarily to the peripheral wall 76*b* albeit non-complementarily to the end surface 76*a*, such that the peripheral edge 108*a* rests atop the peripheral edge 76*c*. The outer surface 108 of the gap filler 100 also defines an outer groove 108*b* open toward the stem peripheral wall 76*b*, defining a transverse gap therebetween relative to the engagement axis E. Depending on the implementation, at least one such gap may be in fluid communication with the flow path 50 absent any residual substance remaining therein. Such gaps may over time become obstructed by fuel-shed residue, such as coke, to form heat transmission media having thermal conductivity greater than air. Such gaps may in some implementations be comparatively greater or smaller, provided in greater number or even be non-existent depending on factors such as design choices (e.g., dimensions, materials) and manufacturing tolerances. The gap filler 100 may thus be said to be sized and arranged relative to the gallery 52 to aid in indirectly filling gaps therein. In any case, the gap filler 100 extends transversely relative to the engagement axis E between a periphery of the gallery 52 (here defined by the peripheral wall 76*b* of the stem 70) and at least one of the first outlet 68*b* and the second inlet 78*a*. Hence, the gap filler 100 may be said to be sized such that a transverse breadth of the third passage 110 is less than that of the gallery 52, at least across a portion of the axial depth of the gallery. Also, the gap filler 100 may be sized so as to be compressed upon being disposed within the gallery 52. In some embodiments, the gap filler 100 has an uncompressed dimension that is greater than a corresponding dimension of the gallery 52. The uncompressed dimension may correspond to a distance taken between the ends 102, 104, for example between respective peripheral edges thereof, absent compression. In such implementations, the corresponding dimension of the gallery 52 may be axial relative to the engagement axis E, and correspond to a distance between the end surfaces 66*a*, 76*a* (i.e., the axial depth upon the running surfaces 64*a*, 74*a* being in the second relative position), among other possibilities. For example, the corresponding dimension of the gallery 52 may be between the end surface 66*a* and the peripheral edge 76*c*. The uncompressed dimension of the gap filler 100 may also be a transverse width of the gap filler 100, which may be a diameter in implementations of the gap filler 100 having one or more circular contours. In such implementations, the corresponding dimension of the gallery 52 may be transverse relative to the engagement axis E, and correspond to a distance between edges of the gallery 52 facing one another from either side of the engagement axis E. The dimension of the gallery 52 may also be an inner diameter in implementations of the gallery having one or more circular contours. For example, the corresponding dimension of the gallery 52 may be a diameter of the peripheral wall 76*b*, such as that at the peripheral edge 76*c*. In some implementations, the gap filler 100 may compress only upon a portion thereof featuring the uncompressed dimension aligning with a portion of the gallery 52 featuring the corresponding dimension. As such, it should be noted that depending on the relative position of the adapter 60 and the stem 70, the gap filler 100 may extend along the axial depth of the gallery 52 absent compression. In the embodiment of FIG. 4, the gap filler 100 is compressed in the axial direction, with the downstream end 104 compressed against the end surface 76*a*, and in the transverse direction, with the outer surface 108 compressed against the peripheral wall 76*b*.

Referring to FIG. 4A to FIG. 4C, features pertaining to alternate embodiments of the nozzle assembly 40 will now be described. In FIG. 4A, an axial gap is defined beneath the gap filler 100 at the bottom of the gallery 52. The gap filler 100 is annular in shape, and compressed in the transverse direction. The inner surface 106 is frusto-conical, in this case generally coaxial with the engagement axis E. The third passage 110 converges as it extends from its inlet 110*a* at the upstream end 102 to its outlet 110*b* at the downstream end 104. In FIG. 4B, an embodiment with yet another annular implementation of the gap filler 100 is shown, with the gap filler 100 compressed in the axial direction. The inner surface 106 has a funnel-like shape constricting as it extends toward the outlet 110*b* of the third passage 110, in this case corresponding to an upstream portion 106*a* thereof extending downstream from the inlet 110*a* of the third passage 110. Next to the upstream portion 106*a*, a downstream portion 106*b* of the inner surface 106 extends to the outlet 110*b*. A cross-sectional profile of the inner surface 106 constricts as the inner surface 106 extends from the inlet 110*a* to the downstream portion 106*b*, the latter in this case having a cylindrical shape. In embodiments wherein the first outlet 68*b* and the second inlet 78*a* are not aligned to one another relative to the engagement axis E, the inner surface 106 is shaped such that the third passage 110 may be said to route, or direct, the flow path 50 from the first passage 68 (or the first outlet 68*b*) to the second passage 78 (or the second inlet 78*a*). The gap filler 100 of such embodiments may thus be described as directional. In an exemplary embodiment shown in FIG. 4C, the gap filler 100 is compressed in the transverse direction. Axial projections of the first outlet 68*b* and of the second inlet 78*a* are not mutually congruent. For instance, a portion of the first outlet 68*b* may overhang past the second inlet 78*a* relative to the engagement axis E. The inner surface 106 may be shaped so as to lead generally away from the overhanging portion of the first outlet 68*b* and toward the second inlet 78*a* as it extends away from the upstream end 102 toward the downstream end 104. In some such embodiments, the inner surface 106 has a cylindrical shape yet extends at an angle D relative to the engagement axis E along a notional line defined between respective geometrical centers of the first outlet 68b and the second inlet 78a. However, the inner surface 106 does not necessarily have to extend linearly as it extends between the first outlet 68b and the second inlet 78a for the gap filler 100 to be directional. In some embodiments, the gap filler 100 may have a keying feature shaped to engage with a complementary keying feature defined by one of the gallery-defining engagement surfaces 66, 76 of the nozzle mount 90. As such, the gap filler 100 is, once keyed, held in a directional position relative to the complementary keying feature enabling proper positioning of the third passage 110 relative to the first and second passages 68, 78. The keying feature may in some cases be an anti-rotational feature adapted to hinder rotation of the gap filler 100 about the engagement axis E. In alternate embodiments in which keying features are omitted, the gap filler 100 is affixed to either one of the gallery-defining engagement surfaces 66, 76 in the directional position. For instance, the gap filler 100 and the adapter 60 may be machined integrally from a unitary piece, or be mechanically joined together via a number of suitable means.

In FIG. 5, there is shown another embodiment of the nozzle assembly 40 in which the gap filler 100, compressed in the axial direction, has a wall-like construction. The inner surface 106 is transversely open relative to the engagement axis E, i.e., the inner surface 106 does not entirely surround, or enclose, the third passage 110 as it extends axially relative to the engagement axis E. Rather, the gap filler 100 partitions the gallery 52, and the inner surface 106 faces a portion of the peripheral wall 76b of the stem engagement surface 76 with which it surrounds the third passage 110. Although the inner surface 106 is shown as having a straight cross-sectional profile, the inner surface 106 may, in other implementations of the gap filler 100, curve as it extends axially relative to the engagement axis E inside the gallery 52 or, as the case may be, as it partially surrounds either one or both of the first outlet 68b and the second inlet 78b. Either end 102, 104 of the inner surface 106 may conform to a corresponding one of the first outlet 68b and the second inlet 78b.

In embodiments, the gap filler 100 includes a reinforcement 112 (FIG. 5) provided to reinforce the gap filler 100, i.e., to impart the gap filler 100 with suitable compressive strength. The reinforcement 112 may extend between the upstream and downstream ends 102, 104 along the inner surface 106. The reinforcement 112 may be structured and arranged such that the gap filler 100 does not buckle as it conforms to the axial depth of the gallery 52, or at least such that the inner surface 106 does not materially deform in such a way that hinders the flow of fuel across the gallery 52. The material of the reinforcement 112 may have a thermal conductivity greater than that of the elastomer. Among non-limiting examples, materials suitable for the reinforcement 112 include metallic materials, alloys and composite materials. The reinforcement 112 may be a sleeve or an insert joined to a remainder of the gap filler 100 by any suitable means, permanent or not. In embodiments, the reinforcement 112 is a portion of the gap filler 100 having been locally strengthened. In embodiments, the gap filler 100 is constructed of a plurality of materials including an elastomer. In such embodiments, the reinforcement 112 may be constructed of a material of a rigidity greater than that of the elastomer. The reinforcement 112 may in some cases be embedded into the elastomer, for example via overmolding or interference fit assembly techniques.

The gap filler 100 may thus be provided for the gallery 52 of a new nozzle assembly 40, or be retrofitted in the gallery 52 of a previously used nozzle assembly 40, for example during maintenance or refurbishing. Under certain operating conditions of a gas turbine engine 10 whose nozzle assembly 40 was just retrofitted with the gap filler 100, an increase in average fuel flow rate across the nozzle assembly 40 may readily be measurable and, over time, a decrease in coking rate may be observed, at least in the vicinity of the gallery 52.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present technology may be implemented with respect to other gallery-forming fluid conduits provided in aircraft and being otherwise susceptible to cause undesirable hindrance to the fluid flowing therethrough. Yet further modifications could be implemented by a person of ordinary skill in the art in view of the present disclosure, which modifications would be within the scope of the present technology.

The invention claimed is:

1. A fuel nozzle assembly for a fuel system of a gas turbine engine, the fuel nozzle assembly comprising:
   a fuel nozzle at a downstream end of the fuel nozzle assembly relative to fuel flow through the fuel nozzle assembly;
   a first body and a second body upstream of the fuel nozzle, the first body defining a first fuel passage extending between a first inlet fluidly connectable to a fuel source of the fuel system and a first outlet, and the second body defining a second fuel passage extending between a second inlet and a second outlet in fluid communication with the nozzle, the first outlet and the second inlet being in fluid communication with each other;
   a downstream end of the first body having the first outlet and an upstream end of the second body having the second inlet matingly engaged together along an engagement axis, the first outlet and the second inlet being spaced apart in an axial direction relative to the engagement axis to define a gallery between the first body and the second body, the gallery having a depth in the axial direction and a width in a transverse direction relative to the engagement axis; and
   a gap filler disposed within the gallery, the gap filler being compressible in at least one of the axial direction and the transverse direction, the gap filler having an uncompressed dimension in said at least one of the axial direction and the transverse direction, the uncompressed dimension being greater than a corresponding dimension of the gallery in said at least one of the axial direction and the transverse direction,
   wherein the second body is a fuel stem having a flange fastenable to a casing of the gas turbine engine, and the first body is a fuel adapter structured to be fitted between a fuel line of the gas turbine engine and the fuel stem.

2. The fuel nozzle assembly of claim 1, wherein the gap filler has an upstream end, a downstream end and inner surface extending therebetween along the depth of the gallery, the inner surface exposed to the first outlet and separating a portion of the gallery therefrom.

3. The fuel nozzle assembly of claim 2, wherein the inner surface surrounds a third fuel passage extending from the upstream end to the downstream end of the gap filler, the third fuel passage providing fluid communication between the first outlet and the second inlet.

4. The fuel nozzle assembly of claim 3, wherein the inner surface has an annular shape.

5. The fuel nozzle assembly of claim 4, wherein at least a portion of the inner surface is shaped so as to constrict the third fuel passage as it extends away from the first outlet.

6. The fuel nozzle assembly of claim 2, wherein the first outlet has an overhanging portion extending past the second outlet relatively to the engagement axis, and the inner surface is shaped so as to lead generally away from the overhanging portion of the first outlet and toward the second inlet as it extends away from the upstream toward the downstream end.

7. The fuel nozzle assembly of claim 1, wherein the upstream end of the second body has a peripheral wall surrounding the gallery and defining the width of the gallery relative to the engagement axis, the gap filler extending transversely relative to the engagement axis between the peripheral wall and at least one of the first outlet and the second inlet.

8. The fuel nozzle assembly of claim 7, wherein a downstream end of the gap filler rests onto a peripheral edge of the peripheral wall, an axial gap of the gallery defined axially relative to the engagement axis between the downstream end of the gap filler and the second inlet.

9. The fuel nozzle assembly of claim 7, wherein an outer surface of the gap filler facing transversely away relative to the engagement axis is spaced from the peripheral wall, a transverse gap of the gallery defined transversely relative to the engagement axis between the outer surface and the peripheral wall.

10. The fuel nozzle assembly of claim 1, wherein the gap filler includes a reinforcement disposed axially relative to the engagement axis.

11. The fuel nozzle assembly of claim 1, wherein the gap filler has an upstream end, a downstream end and inner surface extending therebetween along the depth of the gallery, and at least a portion of the inner surface constricts as it extends toward the downstream end of the gap filler.

12. A gas turbine engine, comprising:
a compressor, a turbine and a combustor disposed between the compressor and the turbine, the combustor including a casing and a fuel nozzle assembly received inside the casing, the fuel nozzle assembly including:
a fuel nozzle at a downstream end of the fuel nozzle assembly relative to fuel flow through the fuel nozzle assembly;
a fuel nozzle adapter and a fuel nozzle stem upstream of the fuel nozzle, the adapter defining a first fuel passage extending between a first inlet in fluid communication with a fuel source of the gas turbine engine and a first outlet, and the stem defining a second fuel passage extending between a second inlet and a second outlet in fluid communication with the fuel nozzle, the first outlet and the second inlet being in fluid communication with each other;
a downstream end of the adapter having the first outlet and an upstream end of the stem having the second inlet matingly engaged together along an engagement axis, the first outlet and the second inlet being spaced apart in an axial direction relative to the engagement axis to define a gallery between the adapter and the stem, the gallery having a depth in the axial direction; and
a gap filler disposed within the gallery, the gap filler being compressible in the axial direction, the gap filler having an uncompressed axial length being greater than a corresponding dimension of the gallery in the axial direction,
wherein the adapter and the stem are positionable relative to one another along the engagement axis between a first position corresponding to a maximum depth of the gallery and a second position corresponding to a minimum depth of the gallery, the uncompressed axial length of the gap filler being greater than the minimum depth of the gallery.

13. The gas turbine engine of claim 12, wherein the gap filler is affixed to the downstream end of the adapter, the stem movable with the fuel nozzle along the engagement axis relative to the gap filler.

14. The gas turbine engine of claim 13, wherein the adapter and the gap filler form a unitary piece.

15. The gas turbine engine of claim 12, wherein the gap filler has an upstream end, a downstream end and an inner surface extending therebetween as it extends axially relative to the axial depth of the gallery, the inner surface exposed to the first outlet and to the second inlet.

16. The gas turbine engine of claim 15, wherein the gap filler has an annular shape, the inner surface surrounding a third passage extending from the upstream end to the downstream end of the gap filler.

17. The gas turbine engine of claim 16, wherein at least a portion of the inner surface constricts as it extends toward the downstream end of the gap filler.

18. The gas turbine engine of claim 12, wherein the gap filler has an upstream end, a downstream end and an inner surface extending therebetween as it extends axially relative to the axial depth of the gallery, and at least a portion of the inner surface constricts as it extends toward the downstream end of the gap filler.

* * * * *